United States Patent
Lee

(10) Patent No.: US 9,213,824 B2
(45) Date of Patent: Dec. 15, 2015

(54) ELECTRONIC DEVICE AND UNLOCKING METHOD THEREOF

(71) Applicant: Wistron Corporation, New Taipei (TW)

(72) Inventor: Hsu-Ming Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 60 days.

(21) Appl. No.: 14/159,445

(22) Filed: Jan. 21, 2014

(65) Prior Publication Data

US 2015/0089664 A1 Mar. 26, 2015

(30) Foreign Application Priority Data

Sep. 24, 2013 (TW) .............................. 102134305 A

(51) Int. Cl.
*G06F 21/36* (2013.01)

(52) U.S. Cl.
CPC ..................................... *G06F 21/36* (2013.01)

(58) Field of Classification Search
None
See application file for complete search history.

(56) References Cited

U.S. PATENT DOCUMENTS

| | | | |
|---|---|---|---|
| 2007/0120835 A1* | 5/2007 | Sato .............................. | 345/173 |
| 2012/0129495 A1* | 5/2012 | Chae et al. .................... | 455/411 |
| 2012/0174042 A1* | 7/2012 | Chang .......................... | 715/863 |

* cited by examiner

*Primary Examiner* — David Le
(74) *Attorney, Agent, or Firm* — Jianq Chyun IP Office

(57) ABSTRACT

An electronic device and an unlocking method thereof are provided. The electronic device has a touch screen, and the unlocking method includes following steps. When the electronic device is at a locking state, a first input and a second input corresponding to each other are received. Symbol information displayed on the touch screen is obtained according to the first input, and direction information is obtained according to the second input. When the symbol information and the direction information are matched to a predefined unlocking condition, the electronic device is switched to an unlocking state. When the symbol information and the direction information are not matched to the predefined unlocking condition, the electronic device is maintained in the locking state.

32 Claims, 12 Drawing Sheets

ELECTRONIC DEVICE AND UNLOCKING METHOD THEREOF

CROSS-REFERENCE TO RELATED APPLICATION

This application claims the priority benefit of Taiwan application serial no. 102134305, filed on Sep. 24, 2013. The entirety of the above-mentioned patent application is hereby incorporated by reference herein and made a part of this specification.

BACKGROUND OF THE INVENTION

1. Field of the Invention

The invention relates to an operation method of an electronic device, in particular, to an unlocking method of the electronic device and an electronic device using the unlocking method.

2. Description of Related Art

In the modern information society, people increasingly rely on electronic devices. To satisfy requirements for convenience, light weight, compactness, and user-friendly interfaces, the input devices of many electronic devices have been changed from traditional keyboards or mice to touch screens. The touch screens may serve as the input and output interfaces of products, and users may not only observe the images through the touch screens but also enter characters or commands to use the electronic devices. Said development of the touch screens has brought a new chapter to the input interfaces of the electronic devices.

In order for the electronic device not to receive false commands without user's awareness, e.g., false operations made by the users accidentally touching the keypads, the electronic device locks the operation interface if the user no longer intends to use the electronic device. Thus, the functions on the operation interface will be activated after the electronic device receives the unlocking command. At this moment, the user is able to issue commands to the electronic device through the operation interface displayed on the touch screen.

On the other hand, with the development of mobile electronic devices and personal mobile communication techniques, users may do a variety of tasks through the mobile electronic devices, for example, conducting transactions through online banking, online shopping, sending and receiving emails, etc. Thus, most of the mobile electronic devices store personal confidential information of the user so that the user may easily and quickly access account information, emails, etc. In addition, the mobile electronic devices usually store other important information, e.g., contact information. In other words, in order to protect the important information in mobile electronic devices or to prevent the electronic device from executing unexpected operations due to the user's accidental touch on the device, locking and unlocking mechanisms on the electronic device should be deemed necessary.

SUMMARY OF THE INVENTION

Accordingly, the invention is directed to an electronic device and an unlocking method thereof. Here, an unlocking method with high security is provided, and thereby the electronic device is unlocked according to the symbol information and the direction of gesture preset by users.

The invention is directed to an unlocking method of an electronic device. The electronic device has a touch screen, and the unlocking method includes following steps. A first input and a second input corresponding to each other are received by the electronic device if the electronic device is at a locking state. Symbol information displayed on the touch screen is obtained according to the first input, and direction information is obtained according to the second input. The electronic device is unlocked if the symbol information and the direction information match a predefined unlocking condition. The electronic device is maintained at the locking state if the symbol information and the direction information do not match the predefined unlocking condition.

In an embodiment of the invention, if the electronic device is at the locking state, the step of receiving the first input and the second input includes receiving the first input after receiving the second input.

In an embodiment of the invention, the step of receiving the first input after receiving the second input includes displaying an unlocking operation interface on the touch screen, and the unlocking operation interface includes a symbol confirmation region. The second input applied on the unlocking operation interface is received through the touch screen, and a moving direction of the second input matches a first predefined direction or a second predefined direction. Each of a plurality of candidate symbols is displayed in turns in the symbol confirmation region of the unlocking operation interface according to the moving direction of the second input, and the types of the candidate symbols include at least one or the combination of numerical symbols, alphabetical symbols, and punctuation symbols. The first input generated in the symbol confirmation region of the unlocking operation interface is received after the second input disappears for a predefined period of time.

In an embodiment of the invention, the step of obtaining the symbol information displayed on the touch screen according to the first input and obtaining the direction information according to the second input includes obtaining the direction information according to the moving direction of the second input before the second input disappears and obtaining the symbol information according to the one of the candidate symbols displayed in the symbol confirmation region when the first input is received.

In an embodiment of the invention, wherein the predefined unlocking condition includes an unlocking symbol and an unlocking direction. The unlocking method further includes displaying a setting interface on the touch screen before the electronic device enters the locking state, and the setting interface includes a symbol confirmation region. An unlocking setting input applied on the setting interface is received through the touch screen, and a moving direction of the unlocking setting input matches the first predefined direction or the second predefined direction. Each of the candidate symbols is displayed in turns in the symbol confirmation region of the setting interface according to the moving direction of the unlocking setting input. The one of the candidate symbols displayed in the symbol confirmation region of the setting interface is set as the unlocking symbol after input confirmation is received, and the last moving direction of the unlocking setting input is set as the unlocking direction before the input confirmation is received.

In an embodiment of the invention, when the electronic device is at the locking state, the step of receiving the first input and the second input includes receiving the second input after receiving the first input.

In an embodiment of the invention, the step of receiving the second input after receiving the first input includes receiving the first input after a first unlocking operation interface is displayed on the touch screen. A second unlocking operation interface is displayed on the touch screen according to the first input and an interface parameter, wherein the interface parameter includes an appearance setting and the number of sub-regions, and the second unlocking operation interface includes a plurality of sub-regions corresponding to the number of sub-regions of the interface parameters. A sliding operation applied on the second unlocking operation interface is received through the touch screen, a start point of the sliding operation is located at the first sub-region of the sub-regions in the second unlocking operation interface, and an end point of the sliding operation is located at the second sub-region of the sub-regions in the second unlocking operation interface. The sliding operation is recognized as the second input.

In an embodiment of the invention, the unlocking method further includes recognizing a candidate symbol corresponding to the first input after receiving the first input, and the candidate symbol is a numerical symbol, an alphabetical symbol, or a punctuation symbol. The candidate symbol is displayed on the first unlocking operation interface. The candidate symbol is displayed in each sub-region when the second unlocking operation interface is displayed on the touch screen.

In an embodiment of the invention, the predefined unlocking condition includes an unlocking symbol and an unlocking direction. The unlocking method further includes setting the interface parameters and displaying the first setting interface on the touch screen for receiving the first unlocking setting input. A symbol corresponding to the first unlocking setting input is recognized, and the symbol is a numerical symbol, an alphabetical symbol, or a punctuation symbol. The symbol is set as the unlocking symbol, and the second setting interface is displayed on the touch screen according to the symbol and the interface parameter after the input confirmation is received, wherein the second setting interface includes a plurality of sub-regions corresponding to the number of the sub-regions. In addition, the symbol is displayed respectively on a portion or all of the sub-regions. The second unlocking setting input is received through the touch screen, the start point of the second unlocking setting input is located at start sub-region of the sub-regions in the second setting interface, and the end point of the second unlocking setting input is located at the end sub-region of the sub-regions in the second unlocking setting interface. A moving direction of the second unlocking setting input is set as the unlocking direction when another input confirmation is received.

In another point of view, the invention is related to an electronic device, and the electronic device includes a touch screen, a memory, at least one processor, and at least one program. The at least one program is stored in the memory and is configured to be executed by the at least one processor. The at least one program includes executing the following commands. The first input and the second input corresponding to each other are received when the electronic device is at a locking state. Symbol information displayed on the touch screen is obtained according to the first input, and the direction information is obtained according to the second input. The electronic device is switched to an unlocking state if the symbol information and the direction information match a predefined unlocking condition. The electronic device is maintained at the locking state if the symbol information and the direction information do not match the predefined unlocking condition.

Based on the above descriptions, in the unlocking method of the electronic device of the invention, whether to unlock the electronic device is determined according to the information and the unlocking condition inputted by the user, and the unlocking condition includes the unlocking symbol and the unlocking direction. Thus, the electronic device can be unlocked and switched to the operation state in which the users is able to issue commands if the information inputted by the user matches the direction information and the symbol information complying with the unlocking condition. Accordingly, the complexity and the security of the locking mechanism of the electronic device are significantly increased, and the possibility of cracking the password is reduced.

Several exemplary embodiments accompanied with figures are described in detail below to further explain the disclosure in details.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
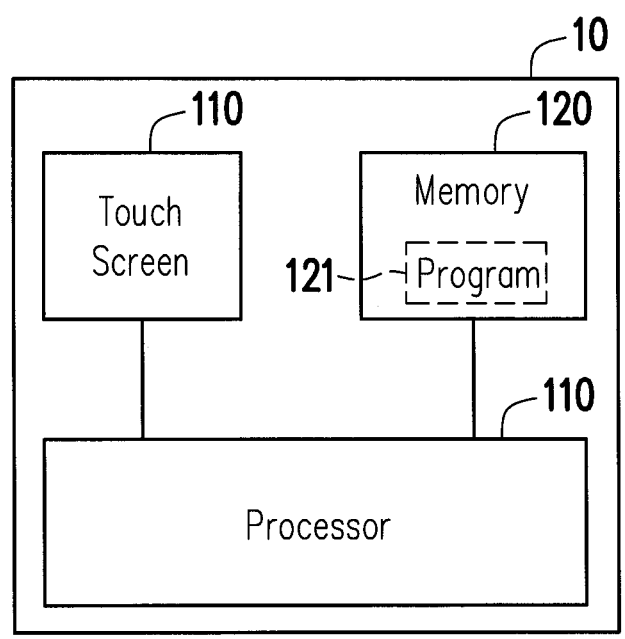
FIG. 1 is a schematic diagram of a mobile electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Generally speaking, when a user applies a sliding operation on a touch screen of an electronic device, information including the direction information of the sliding operation can be determined based on the touch points of the sliding operation. Therefore, whether to unlock the electronic device is determined at least by the information entered by the user through the sliding operation and by the direction information and the symbol information complying with the unlocking condition. To fully convey the spirit of the invention, embodiments are provided below.

FIG. 1 is a schematic diagram of an electronic device according to an embodiment of the invention. With reference to FIG. 1, an electronic device 10 provided in the present embodiment has a touch screen, and the electronic device is, for example, a laptop, a Tablet PC, a personal digital assistant (PDA), a smart phone, an electronic book, a gaming machine, etc., which should not be construed as a limitation to the invention. The electronic device 10 includes a touch screen 110, a memory 120, at least one program 121, and at least one processor 130, and the function of each component is described below.

The touch screen 110 is a display device, and the display device and a touch panel are integrated to perform both the display function and the input function. The display device, for example, may be a liquid crystal display (LCD), a light-emitting diode (LED) display, a field emission display (FED), or any other appropriate display device. The touch panel, for example, may be a resistive touch screen or a capacitive touch screen, but the invention is not limited thereto. The touch screen 110 can detect the sliding operation from the user when displaying images on the electronic device 10; therefore, while the user uses the electronic device 10, different visual outputs can be displayed, and the touch operation applied by the user can be received by the touch screen 110.

The memory 120, for example, can be any type of static or dynamic random access memory (RAM), read-only memory (ROM), flash memory, hard drive, another similar device, or the combination thereof. At least one program 121 is stored in the memory 120 and is configured to be executed by at least one processor 130. To be more specific, the program 121 includes a plurality of commands, and the commands are executed by at least one processor 130. In brief, the processor 130 executes the program 121 in order to perform the unlocking method of the electronic device 10 of the present embodiment. The details of the unlocking method will be described later with reference to the drawings.

The processor 130, for example, may be a central processing unit (CPU), a programmable microprocessor, a digital signal processor (DSP), a programmable controller, an application specific integrated circuit (ASIC), a programmable logic device (PLD), or any other hardware device capable of performing calculation. The processor 130 is configured to execute the commands stored in the memory 120 so as to perform the unlocking method of the electronic device 10 described in the present embodiment.

In detail, the program 121 is stored in the memory 120 and is configured to be executed by the processor 130. The program 121 includes the following operation commands. When the electronic device 10 is at a locking state, the first input and the second input corresponding to each other are received. In detail, the electronic device 10 receives the first input through the touch screen 110 or another physical input unit (e.g., a physical keyboard or a physical keypad) and receives the second input through the touch screen 110. The first input is generated, for example, by the user performing operations directly on the touch screen 110 or another physical input unit; alternatively, the first input is generated by the user performing operations on the touch screen 110 accompanied by the contents displayed on the touch screen 110. The second input is generated by the user directly performing operations on the touch screen 110. For example, the first input and the second input can be generated merely by the user performing touch operations on the touch screen 110. Alternately, the first input can be generated by the user performing other input operations, and then the second operation can be generated by performing the touch operation; note that the invention is not limited thereto.

Moreover, the program 121 also includes the command for obtaining the symbol information displayed on the touch screen according to the first input as well as the command for obtaining the direction information according to the second input. To be specific, the information included in the first input may be the input symbol entered by the user through any kind of input methods, while the second input may be the direction information of the sliding operation performed by the user. Thus, the electronic device 10 is switched to the unlocking state when the symbol information and direction information match the predefined unlocking condition. By contrast, the electronic device 10 is maintained at the locking state when the symbol information and the direction information do not match the predefined unlocking condition. In brief, in order to unlock the electronic device 10, not only the symbol entered by the user needs to match the symbol code predefined by the user, but also the direction of the sliding operation from the user needs to match the predefined direction condition. In this way, the unlocking conditions requiring dual information can further increase the security of the locking mechanism.

Note that the user operation interface of the electronic device 10 can be designed to have different appearances for the user to issue operational commands for the first input and the second input corresponding to the user operation interface, so as to generate the symbol information and the direction information corresponding to the first input and the second input. Moreover, the invention does not limit the order of receiving the first input and the second input; in other words, the order of obtaining the direction information and the symbol information may vary according to different user operation interfaces or the way the input operation is performed by the user. However, the above-mentioned order does not affect the final result of unlocking the electronic device. The electronic device is unlocked as long as the symbol information of the first input and the direction information of the second input match the unlocking conditions simultaneously.

Embodiments are provided in the following paragraphs for explaining different user operating interfaces. The embodiments are categorized into two types in response to different user operating interfaces. One is to receive the first input first, and the other is to receive the second input first. In addition, for further explaining the unlocking method in details, the setting operation before the electronic device is at the locking state and the unlocking operation after the electronic device is at the locking state are elaborated according to the two types of embodiments.

In the following embodiments, according to the design of the user operation interface, the electronic device 10 receives the first input after receiving the second input for unlocking the device 10. The process of setting the predefined unlocking condition is first described hereinafter with reference to FIG. 2 and FIG. 3A to FIG. 3B, and the process of determining whether the predefined unlocking condition matches the direction and the symbol information is further described with reference to FIG. 4 and FIG. 5A to FIG. 5C, wherein the direction information is obtained from the second input that is received first, and the symbol information is obtained from the first input that is received afterwards.

Figure 2:
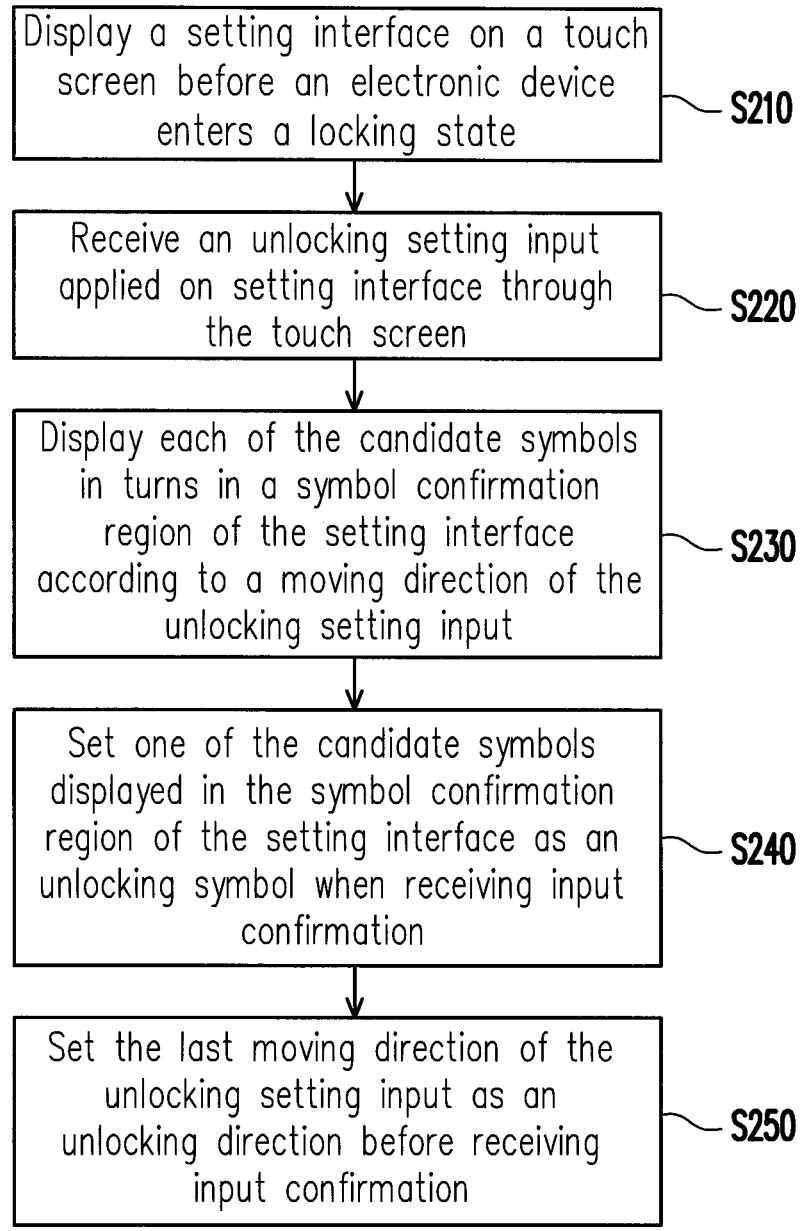
FIG. 2 is a flow chart of a setting stage of an unlocking method according to an embodiment of the invention.

FIG. 2 is a flow chart illustrating a setting stage of an unlocking method according to an embodiment of the invention. As shown in FIG. 1 and FIG. 2, the method provided in the present embodiment is applicable to the aforementioned electronic device 10, and the detailed process of the method is elaborated in the present embodiment with reference to the electronic device 10 depicted in FIG. 1.

In the present embodiment, the processor 130 is configured to execute the program 121 stored in the memory 120 so as to perform each step provided in the embodiment as illustrated in FIG. 2, i.e., to perform the operations for setting the unlocking conditions. First, in step S210, the electronic device 10 displays the setting interface on the touch screen 110 before the electronic device 10 enters the locking state, and the setting interface includes a symbol confirmation region.

Figure 3A:
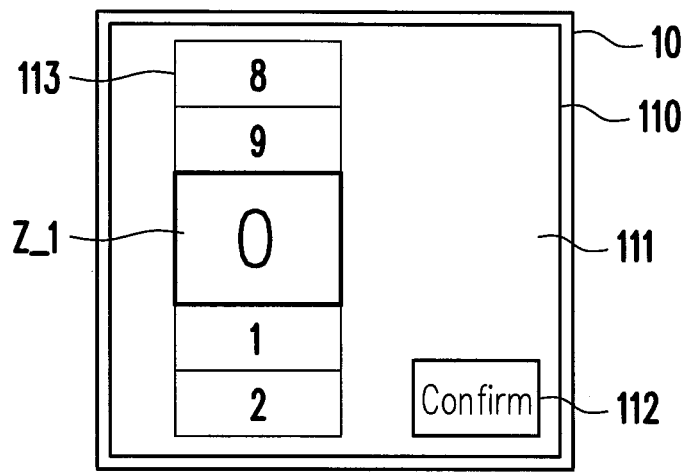
FIG. 3A is a schematic diagram of a setting interface of an electronic device according to an embodiment of the invention.

For example, FIG. 3A is a schematic diagram illustrating a setting interface of an electronic device 10 according to an embodiment of the invention. With reference to FIG. 3A, the setting interface 111 displayed on the touch screen 110 includes a symbol displaying region 113 that displays at least one candidate symbol. In the present embodiment, the candidate symbols are 10 numerical symbols from 0 to 9, but the invention is not limited thereto. In another embodiment, the types of the candidate symbols include the numerical symbols, the alphabetical symbols, the punctuation symbols, and the combination thereof. The alphabetical symbols are language-related symbols and may be English alphabets, Chinese phonetic symbols, Japanese hiragana and katakana, etc., and the invention does not limit the types of languages.

In addition, as exemplarily illustrated in FIG. 3A, five numerical symbols, i.e., numbers 8, 9, 0, 1, and 2, are sequentially displayed in the symbol displaying region 113; however, in other embodiments, the number of numerical symbols displayed in the symbol displaying region may be changed. For example, 3 numerical symbols may be displayed in the symbol displaying region 113. Note that the symbol displaying region 113 includes a symbol confirmation region $Z\_1$ for the user to know the currently-selected numerical symbol.

In step S220, the electronic device 10 receives the unlocking setting input applied on the setting interface through the touch screen 110. Further to say, when the user's hand or a touch input device is in contact with the touch screen 110, the processor 130 determines the user's operation according to the information of the touch points detected by the touch screen 110. According to the design of the setting interface provided the present embodiment, the user may set the predefined unlocking condition through the sliding operation. On the other hand, in response to the design of the setting interface provided in the present embodiment, the moving direction of the unlocking setting input has to match the first predefined direction or the second predefined direction. For example, as illustrated in FIG. 3A, the first predefined direction may be an upward direction and the second predefined direction may be a downward direction if the candidate symbols are arranged to be displayed vertically. The first predefined direction may be leftward and the second predefined direction may be rightward if the candidate symbols are arranged to be displayed horizontally.

Figure 3B:
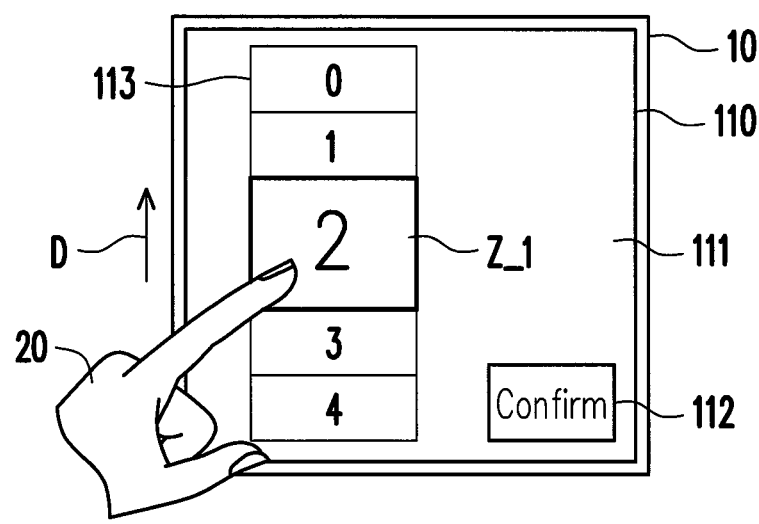
FIG. 3B is a schematic diagram of a setting interface of an electronic device according to an embodiment of the invention.

Next, in step S230, each of the candidate symbols is displayed in turns in the symbol confirmation region of the setting interface according to the moving direction of the unlocking setting input. In brief, different candidate symbols are displayed on the setting interface, which depends on the first predefined direction or the predefined second direction along which the user performs the sliding operation. For example, FIG. 3B is a schematic diagram illustrating a setting interface of an electronic device according to an embodiment of the invention. As shown in FIG. 3B, the user uses his or her hand 20 to slide on the touch screen 110 for the unlocking setting input. When the hand 20 slides along the direction D, the number in the symbol displaying region 113 changes accordingly, and each of the candidate symbols is displayed in turns in the symbol confirmation region $Z\_1$. If the default number in the symbol confirmation region $Z\_1$ is 0 (as illustrated in FIG. 3A), then in the example illustrated in FIG. 3B, when the hand 20 slides along the direction D (upward), numbers 0, 1 and 2 are displayed in such order in the symbol confirmation region $Z\_1$.

In step S240, when the electronic device 10 receives input confirmation, the electronic device 10 sets one of the candidate symbols displayed in the symbol confirmation region of the setting interface as the unlocking symbol. In brief, after the user selects the unlocking symbol, the user stops performing any sliding operation. For example, as illustrated in FIG. 3B, if the user wants to choose number "2" as the unlocking symbol, the hand 20 leaves the touch screen 110 and stops sliding when number "2" is displayed in the symbol confirmation region $Z\_1$. Then, the user can give input confirmation to the electronic device 20 by touching the confirmation region 112 provided by the setting interface 111, so that number "2" is set as the unlocking symbol. Besides, in step S250, the last moving direction of the unlocking setting input is set as the unlocking direction before the electronic device 10 receives the input confirmation.

For example, as illustrated in FIG. 3B, the last moving direction of the unlocking setting input is the direction D (an upward direction) which is set as the unlocking direction. Based on the above, it can be understood that the unlocking setting input entered by the user generates the unlocking direction first and then generates the unlocking symbol. The electronic device 10 may set the unlocking symbol and the unlocking direction which is known only to the user as the unlocking conditions and thereby complete the setting of the unlocking conditions.

Figure 4:
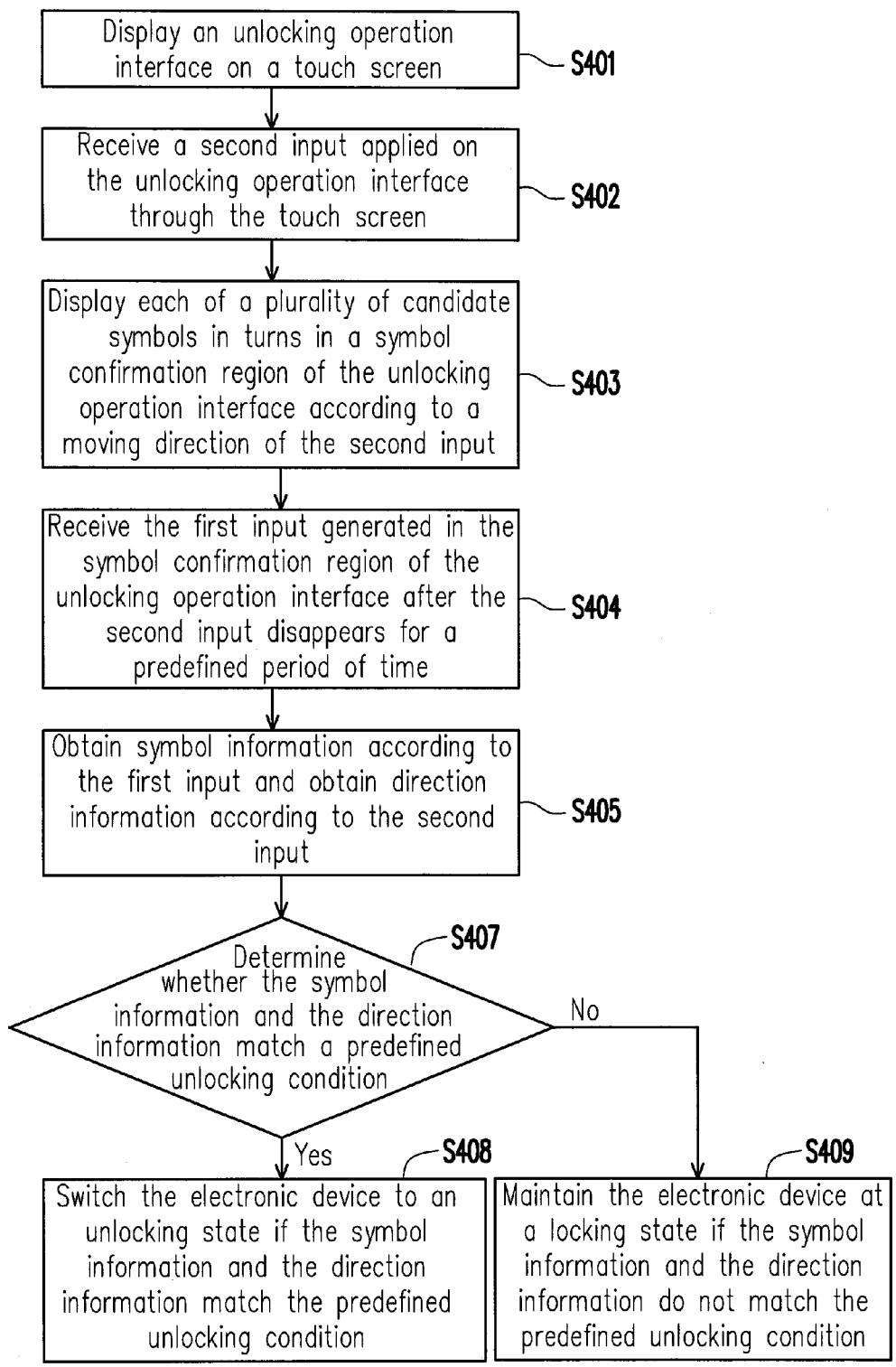
FIG. 4 is a flow chart of an unlocking stage of an unlocking method according to an embodiment of the invention.

FIG. 4 is a flow chart illustrating an unlocking stage of an unlocking method according to an embodiment of the invention. With reference to FIG. 1 and FIG. 4, the method provided in the present embodiment is applicable to the aforementioned electronic device 10, and the detailed process of the method is elaborated below with reference to the electronic device 10 depicted in FIG. 1. In the present embodiment, the processor 130 is configured to execute the program 121 stored in the memory 120 so as to perform each step in the embodiment illustrated in FIG. 4, i.e., perform the unlocking operation when the electronic device is at the locking state.

Figure 5A:
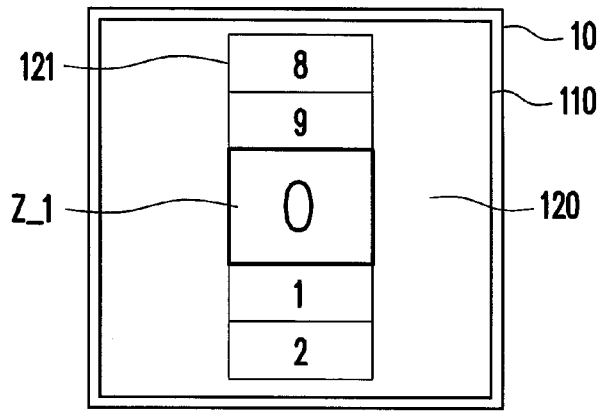
FIG. 5A is a schematic diagram of an unlocking interface of an electronic device according to an embodiment of the invention.

The electronic device 10 receives the first input and the second input corresponding to each other when the electronic device 10 is at the locking state. In the present embodiment, the electronic device 10 receives the first input after receiving the second input, and the details are described below. First, in step S401, the electronic device 10 displays the unlocking operation interface on the touch screen 110, and the unlocking operation interface includes a symbol confirmation region. For example, FIG. 5A is a schematic diagram illustrating an unlocking operation interface of an electronic device according to an embodiment of the invention. With reference to FIG. 5A, the unlocking operation interface 120 displays the symbol displaying region 121 which displays at least one candidate symbol. In the present embodiment, the candidate symbols are numbers 0 to 9, but the invention is not limited thereto. In another embodiment, the types of the candidate symbols include numerical symbols, alphabetical symbols, punctuation symbols, and the combination thereof. The alphabetical symbols are language-related symbols which may be English alphabets, Chinese phonetic symbols, Japanese hiragana and katakana, etc. The candidate symbols displayed on the unlocking operation interface 120 is the same as the candidate symbols displayed on the setting interface 111.

Note that the appearance of the unlocking operation interface is similar to the appearance of the setting interface according to the above descriptions of the setting interface depicted in FIG. 3A; however, the two interfaces may be different to some extent. To be specific, the setting interface and the unlocking operation interface may provide different prompts for the user to intuitively and clearly set the unlocking conditions and unlock the electronic device respectively. In step S402, the electronic device 10 receives the second input applied to the unlocking operation interface through the touch screen 110, wherein the moving direction of the second input matches the first predefined direction or the second predefined direction. In step S403, the electronic device 10 displays each of a plurality of candidate symbols in turns in the symbol confirmation region of the unlocking operation interface.

Figure 5B:
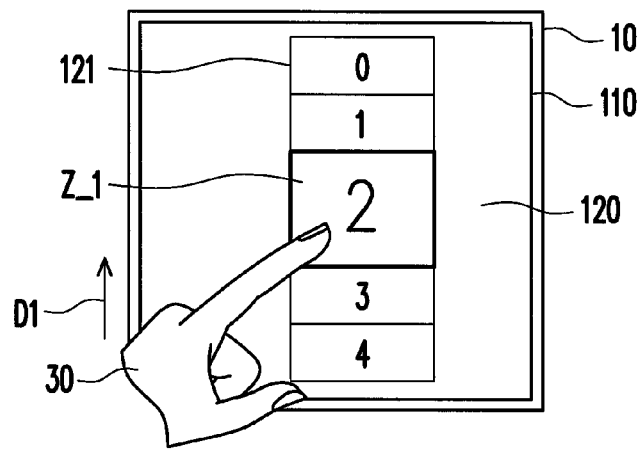
FIG. 5B is a schematic diagram of an unlocking interface of an electronic device according to an embodiment of the invention.
Figure 5C:
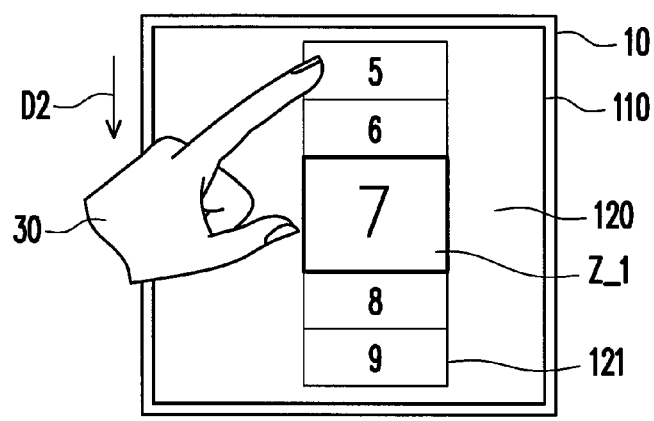
FIG. 5C is a schematic diagram of an unlocking interface of an electronic device according to an embodiment of the invention.

To be specific, FIG. 5B and FIG. 5C are schematic diagrams illustrating an unlocking operation interface of an electronic device according to an embodiment of the invention. With reference to FIG. 5B, both the candidate number in the symbol displaying region 121 of the unlocking operation interface 120 and the number in the symbol confirmation region Z__1 are changed as the user's hand 30 slides along the direction D1 (upward). In the present embodiment, when the hand 30 slides upward, the number in the symbol confirmation region Z__1 is changed from the default number "0" to "1" and then from "1" to "2". The invention does not limit the number and the types of the displayed candidate symbols.

On the other hand, with reference to FIG. 5C, both the candidate number in the symbol displaying region 121 of the unlocking operation interface 120 and the number in the symbol confirmation region Z__1 are changed as the user's hand 30 slides along the direction D2 (downward). In the present embodiment, when the hand 30 slides downward, the number in the symbol confirmation region Z__1 changes from the default number "0" to "9", then from "9" to "8", and then from "8" to "7".

Next, the electronic device 10 obtains the symbol information displayed on the touch screen 110 according to the first input and obtains the direction information according to the second input. In detail, in step S404, the electronic device 10 receives the first input that is generated in the symbol confirmation region of the unlocking operation interface after the second input disappears for a predefined period of time. Further to say, after the user selects the symbol for unlocking the device 20, the hand of the user stops performing a sliding operation as the second input on the touch screen 110. Thus, it can be said that the user already finishes selecting the symbol for unlocking the device 10 after the second input disappears for a predefined period of time. The predefined period of time, for example, may be 2 seconds or 3 seconds and may be set according to actual requirements, and the invention is not limited thereto.

Therefore, in step S405, the electronic device 10 obtains the symbol information displayed on the touch screen 110 according to the first input and the direction information according to the second input. Specifically, the electronic device 10 obtains the direction information according to the moving direction before the second input disappears and obtains the symbol information according to the candidate symbol that is displayed in the symbol confirmation region when the first input is received. For example, if the user wants to choose number "2" as the unlocking symbol, as illustrated in FIG. 5B, the hand 30 of the user may slide upwardly along the direction D1 until number "2" is displayed in the symbol confirmation region. When number "2" is displayed in the symbol confirmation region Z__1, the hand 30 leaves the touch screen 110; that is, the second input disappears. At this moment, the electronic device 10 obtains the direction D1 as the direction information entered by the user and sets the number "2" displayed in the symbol confirmation region Z__1 as the symbol information.

In addition, as illustrated in FIG. 5C, if the user wants to choose number "7" as the unlocking symbol, the hand 30 may slide downwardly along the direction D2 until number "7" is displayed in the symbol confirmation region. When number "7" is displayed in the symbol confirmation region Z__1, the hand 30 leaves the touch screen 110; that is, the second input disappears. At this moment, the electronic device 10 obtains the direction D2 as the direction information (the downward direction) entered by the user and sets the number "7" displayed in the symbol confirmation region Z__1 as the symbol information.

In step S407, the electronic device 10 determines whether the symbol information and the direction information match the predefined unlocking condition. In brief, it is determined that the symbol information and the direction information match the predefined unlocking condition if the symbol information matches the unlocking symbol and if the direction information matches the unlocking direction. The unlocking symbol and the unlocking direction may be predefined, or generated through the steps illustrated in FIG. 2. Next, in step S408, the electronic device 10 is switched to unlocking state if the symbol information and the direction information match the predefined unlocking condition. In step S409, the electronic device 10 is maintained at the locking state if the symbol information and the direction information do not match the predefined unlocking condition.

Figure 6:
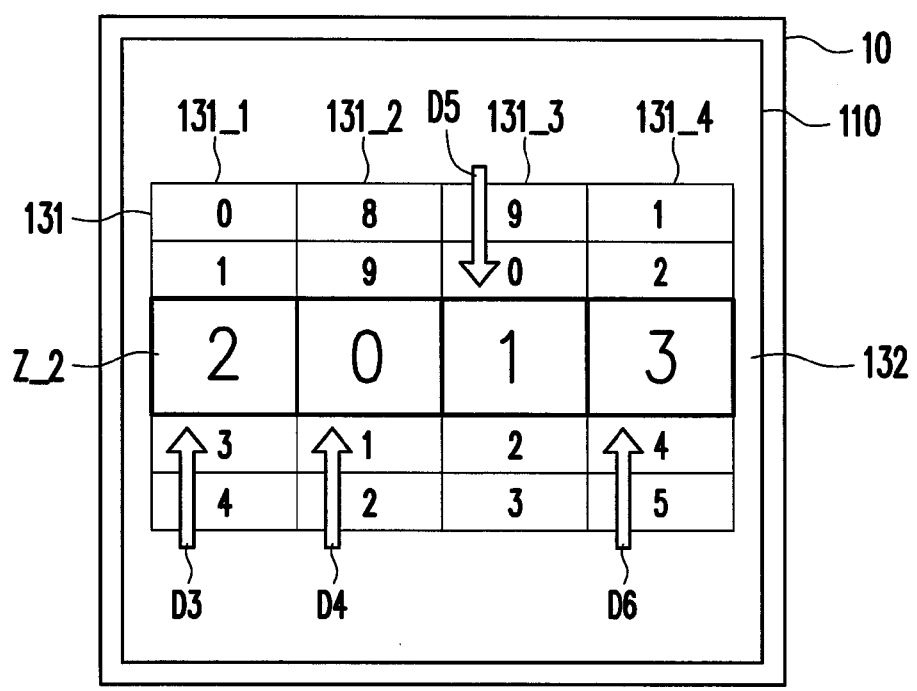
FIG. 6 is a schematic diagram of an unlocking interface of an electronic device according to an embodiment of the invention.

Note that the examples above are illustrated in case of one unlocking symbol and one unlocking direction, whereas the invention is not limited thereto. The number of the unlocking symbols and the number of the unlocking directions are set according to the actual requirements as long as the unlocking method is performed by means of the unlocking symbol and the unlocking direction along which the touch operation is performed. For example, FIG. 6 is an exemplary schematic diagram illustrating an unlocking method according to an embodiment of the invention. An unlocking operation interface 132 is displayed on the touch screen 110 of the electronic device 10, wherein four columns of the candidate symbol regions 131__1-131__4 are displayed in the symbol displaying region 131. Here, the numbers "1" to "9" are displayed respectively in each column of the candidate symbol regions 131__1-131__4. Moreover, the symbol displaying region 131 further includes a symbol confirmation region Z__2, and the symbol confirmation region Z__2 includes the unlocking symbols from each column of the candidate symbol regions 131__1-131__4. After the setting operation is finished before the electronic device 10 enters the unlocking state, if the unlocking symbols of the unlocking conditions are "2013", then the direction information corresponding to each symbol information is in the order of "upward, upward, downward, and upward".

After the electronic device 10 enters the locking state, the user has to toggle the candidate numbers upwardly along the direction D3 in the first column candidate symbol region 131_1 until the number "2" is displayed in the symbol confirmation region Z_2 of the first column candidate symbol 131_1. Similarly, the user has to toggle the candidate numbers upwardly along the direction D4 in the second column candidate symbol region 131_2 until number "0" is displayed in the symbol confirmation region Z_2, toggle the candidate numbers downwardly along the direction D5 in the third column candidate symbol region 131_3 until number "1" is displayed in the symbol confirmation region Z_2, and toggle the candidate numbers upwardly along the direction D6 in the fourth column candidate symbol region 131_4 until number "3" is displayed in the symbol confirmation region Z_2. The electronic device 10 is switched to the unlocking state when all the direction conditions and the symbol conditions of the unlocking conditions are satisfied.

In the following embodiments, according to the design of the user operation interface, the electronic device 10 receives the second input used for performing an unlocking operation after receiving the first input used for performing an unlocking operation. In other words, the electronic device 10 first obtains the symbol information and then obtains the direction information either during the setting operation or during the unlocking operation. The process of pre-setting the predefined unlocking condition is elaborated hereinafter with reference to FIG. 7 and FIG. 8A to FIG. 8D, and the process of receiving the first input and the second input is elaborated with reference to FIG. 9 and FIG. 10; at this time, the symbol information and the direction information are obtained from the first input and the second input to determine whether the symbol information and the direction information match the predefined unlocking condition.

Figure 7:
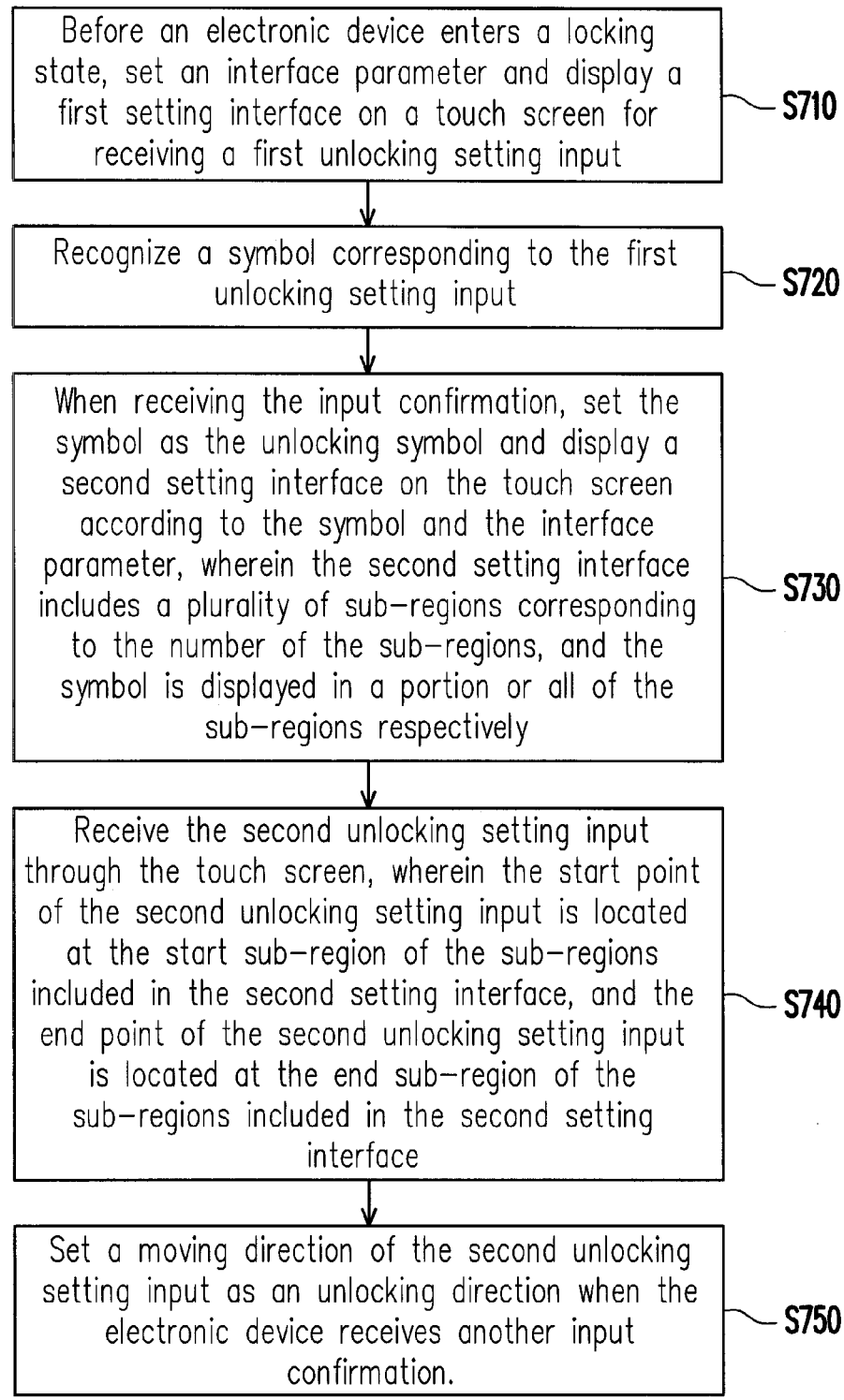
FIG. 7 is a flow chart of a setting stage of an unlocking method according to an embodiment of the invention.

FIG. 7 is a flow chart of a setting stage of an unlocking method according to an embodiment of the invention. With reference to FIG. 1 and FIG. 7, the method described in the present embodiment is applicable to the electronic device 10 described above, and the detailed process of the method is elaborated hereinafter with reference to the electronic device 10 shown in FIG. 1.

In the present embodiment, the processor 130 is configured to execute the program 121 stored in the memory 120 for performing each step of the method provided in the embodiment as illustrated in FIG. 7; that is, the unlocking conditions are set before the electronic device enters the unlocking state. The detailed steps of setting the unlocking conditions are explained below. First, in step S710, before the electronic device 10 enters the locking state, the interface parameters are set by the electronic device 10, and the first setting interface is displayed on the touch screen for receiving the first unlocking setting input. The order of setting the interface parameters and receiving the first unlocking setting input may be switched, and the invention is not limited thereto. In brief, the first setting interface serves to receive the unlocking symbols entered by the user, and the unlocking symbols serve to authenticate the unlocking operation. The appearance of the interface during the unlocking operation is determined by the settings of the interface parameters, and different direction information may be generated according to different appearances of the unlocking interface. That is, in the present embodiment, the user is allowed to set the user operation interface used for performing the unlocking operation. Thus, while the unlocking conditions are set, the electronic device 10 receives the settings from the user so as to determine the user operation interface for performing the unlocking operation.

In step S720, the electronic device 10 recognizes the symbol corresponding to the first unlocking setting input, wherein the types of the symbols are numerical symbols, alphabetical symbols, or punctuation symbols. The user may enter the symbols corresponding to the first unlocking setting input through different ways, such as through a software input panel (SIP), a symbol selecting interface, or a handwriting input interface provided by the electronic device 10 through the touch screen 110, or through a physical input unit, e.g., a physical keypad or a physical keyboard. In step S730, when the input confirmation is received by the electronic device 10, the electronic device 10 sets the symbol as the unlocking symbol, and the second setting interface is displayed on the touch screen 110 according to the symbol and the interface parameter. The second setting interface includes a plurality of sub-regions corresponding to the number of the sub-regions, and the symbol is displayed in parts or all of the sub-regions, respectively.

Figure 8A:
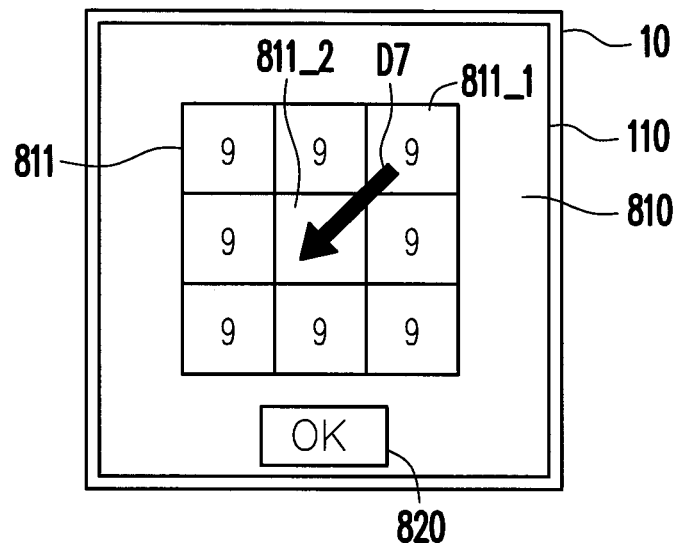
FIG. 8A is a schematic diagram of a setting interface of an electronic device according to an embodiment of the invention.

For example, FIG. 8A is a schematic diagram of a second setting interface of an electronic device according to an embodiment of the invention. As shown in FIG. 8A, if the number "9" is recognized as the symbol corresponding to the first unlocking setting input, the number "9" is set as the unlocking symbol by the electronic device 10. Moreover, the electronic device 10 displays the second setting interface 810 on the touch screen 110 according to the number "9" and the interface parameters. The symbol displaying region 811 of the second setting interface 810 includes 9 sub-regions, and those sub-regions are arranged in a nine-square-grid manner. Besides, the number "9" is displayed in each sub-region except for the one in the center. In other words, in steps S710-S730, the electronic device 10 receives the user's settings of the second setting interface 810 and the unlocking symbol, wherein the unlocking symbol is the number "9", and the interface parameters determine the number of the sub-regions to be nine and also determine the second setting interface 810 to be look like a nine-square grid. Thus, the setting interface displayed on the electronic device 10 is as shown in FIG. 8A, so that the user can enter the unlocking direction of the unlocking conditions according to the second setting interface.

Figure 8B:
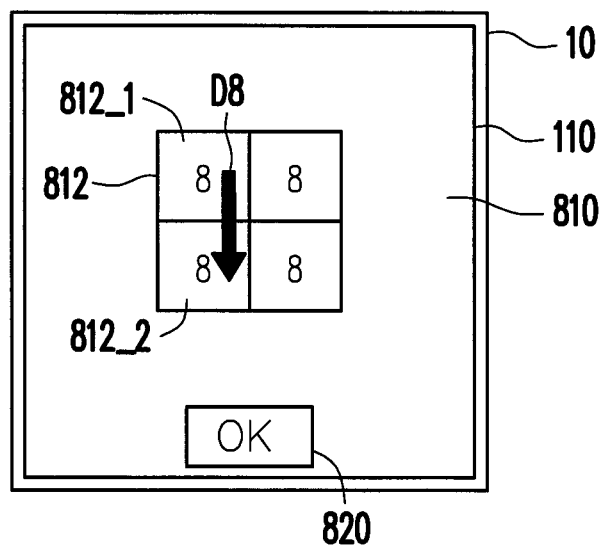
FIG. 8B is a schematic diagram of a setting interface of an electronic device according to an embodiment of the invention.
Figure 8C:
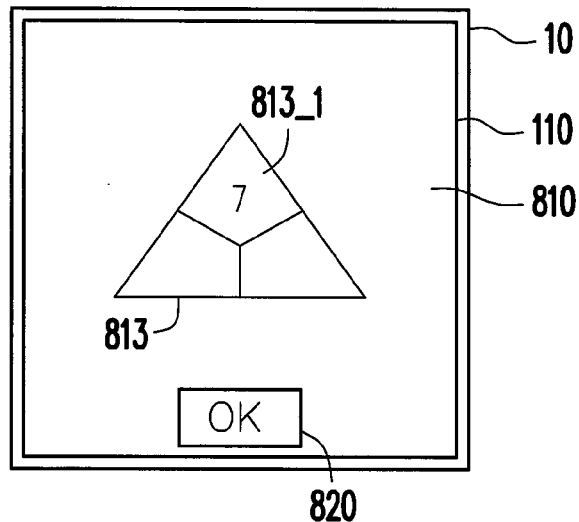
FIG. 8C is a schematic diagram of a setting interface of an electronic device according to an embodiment of the invention.

However, the invention does not limit the number and the appearance of the sub-regions. With reference to FIG. 8B, FIG. 8B is a schematic diagram of a second setting interface according to an embodiment of the invention. If the number "8" is recognized as the symbol corresponding to the first unlocking setting input, the number "8" is set as the unlocking symbol by the electronic device 10. Moreover, the electronic device 10 displays the second setting interface 810 on the touch screen 110 according to the number "8" and the interface parameters. The symbol displaying region 812 of the second setting interface 810 includes 4 sub-regions, and those sub-regions are arranged in a four-square-grid manner, and number "8" is displayed in each sub-region. In addition, FIG. 8C is a schematic diagram of a second setting interface according to an embodiment of the invention. With reference to FIG. 8C, if the number "7" is recognized as the symbol corresponding to the first unlocking setting input, the number "7" is set as the unlocking symbol by the electronic device 10. Moreover, the electronic device 10 displays the second setting interface 810 on the touch screen 110 according to the number "7" and the interface parameters. The symbol displaying region 813 of the second setting interface 810 includes 3 sub-regions, those sub-regions are arranged in a triangular manner as shown in FIG. 8C, and number "7" is only displayed in the sub region 813_1 which is located at the top portion of the triangle.

Figure 8D:
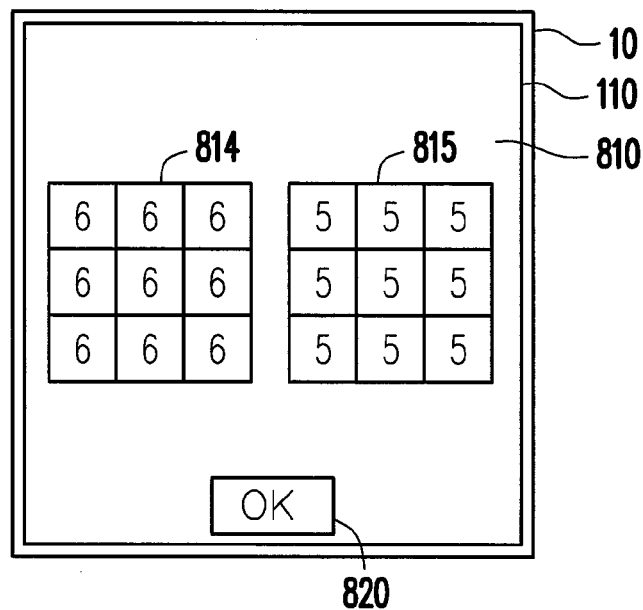
FIG. 8D is a schematic diagram of a setting interface of an electronic device according to an embodiment of the invention.

Moreover, in the examples illustrated in FIG. 8A to FIG. 8C, the number of the unlocking symbol is singular, but the invention is not limited thereto. For example, FIG. 8D is a schematic diagram of a second setting interface according to an embodiment of the invention. In the example illustrated in FIG. 8D, the unlocking symbols are composed of two numbers. Thus, according to the settings of the unlocking symbols and the interface parameters, the second setting interface 810 may be as illustrated in FIG. 8D, wherein the second setting interface 810 includes two number displaying regions 814 and 815 arranged in a nine-square-grid manner, and each region corresponds to one of the unlocking numbers '6' and '5'.

As shown in FIG. 7, in step S740, the electronic device 10 receives the second unlocking setting input through the touch screen 110. The start point of the second unlocking setting input is located at one of the sub-regions included in the second setting interface (referred to as start sub-region hereinafter), and the end point of the second unlocking setting input is located at one of the sub-regions included in the second setting interface (referred to as an end sub-region hereinafter). In step S750, the moving direction of the second unlocking setting input is set as the unlocking direction when the electronic device 10 receives another input confirmation.

For example, as shown FIG. 8A, the electronic device 10 receives the second unlocking setting input through the touch screen 110, wherein the second unlocking setting input is generated by the user applying a sliding operation on the touch screen 110. In FIG. 8A, the sliding operation starts from the upper right corner of the nine-square grid and stops at the center of the nine-square grid. In other words, the start point of the second unlocking setting input is located at the start sub-region 811_1 of the sub-regions included in the second setting interface 810, and the end point of the second unlocking setting input is located at the end sub-region 811_2 of the sub-regions included in the second setting interface 810. Next, the user gives input confirmation to the electronic device 10 by touching the confirmation region 820. The moving direction D7 of the second unlocking setting input is set as the unlocking direction after the electronic device 10 receives the input confirmation.

Note that the end sub-region among the sub-regions in the second setting interface has a fixed position or a non-fixed position. For example, when the end sub-region has a fixed position (e.g., at the center of the nine-square grid), no symbol is displayed in the end sub-region. As shown in FIG. 8A, the end sub-region is the sub-region 811_2 at the center of the nine-square grid. Thus, the number "9" is displayed in each sub-region of the nine-square grid except for the center sub-region. However, when the sub-region does not have a fixed position, the end sub-region may be any sub-region of the nine-square grid. Moreover, the design of the second setting interface allows the user to enter different second unlocking settings. For example, as shown in FIG. 8B, the sliding operation starts at the sub-region at the upper-left corner and stops at the sub-region at the lower-left corner. Thus, the start point of the second unlocking setting input is at the start sub-region 812_1 of the sub-regions included in the second setting interface 810, and the end point of the second unlocking setting input is at the end sub-region 812_2 of the sub-regions included in the second setting interface 810. When the electronic device 10 receives the input confirmation entered by the user through the confirmation region 820, the moving direction D8 of the second unlocking setting input is set as the unlocking direction.

It is worth mentioning that in the embodiment of the invention, the electronic device 10 may display the first reminding effect in the start sub-region when the touch screen 110 receives the second unlocking setting input. The electronic device 10 may display the second reminding effect in the end sub-region when the second unlocking setting input is completed. For example, the symbol in the start sub-region becomes smaller, and the symbol in the end sub-region becomes larger. In addition, the start sub-region and the end sub-region may be labelled separately by colors, or the symbol may be moved correspondingly according to the sliding trace of the second unlocking setting input. In this way, the user may be well aware of the unlocking direction defined by the sliding operation.

Figure 9:
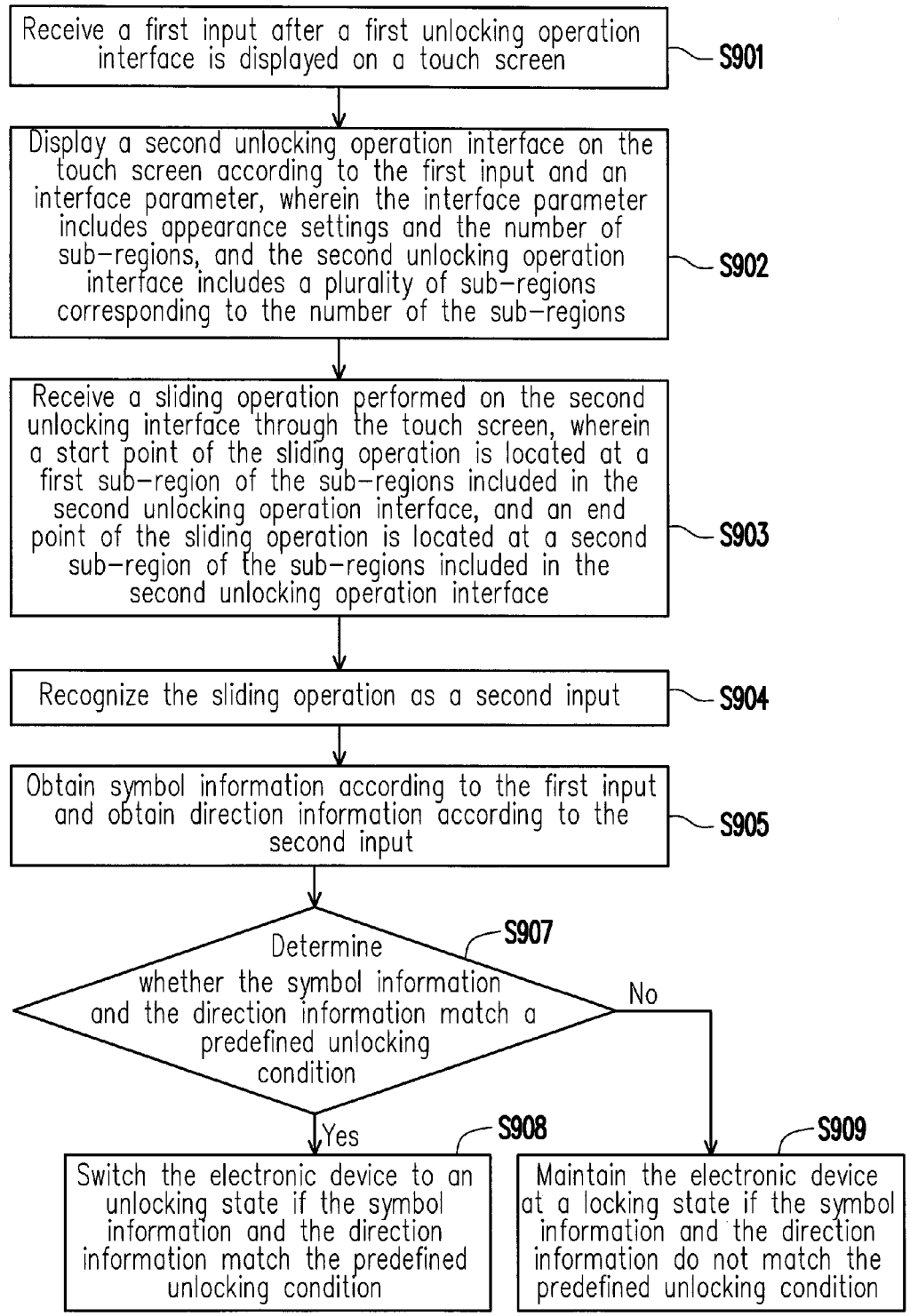
FIG. 9 is a flow chart of an unlocking stage of an unlocking method according to an embodiment of the invention.

FIG. 9 is a flow chart of an unlocking stage of an unlocking method according to an embodiment of the invention. With reference to FIG. 1 and FIG. 9, the method in the present embodiment is applicable to the aforementioned electronic device 10. The detailed process of the method provided in the present embodiment is described below with reference to the electronic device 10 depicted in FIG. 1. In the present embodiment, the processor 130 is configured to execute the program 121 stored in the memory 120, so that each step illustrated in FIG. 9 can be performed. That is, the unlocking operation is performed after the electronic device is at the locking state.

The electronic device 10 may receive the first input and the second input corresponding to each other if the electronic device 10 is at the locking state and determine whether to unlock the electronic device 10 according to the first input and the second input. In the present embodiment, note that the electronic device 10 receives the second input after receiving the first input, wherein the first input corresponds to the symbol information, and the second input corresponds to the direction information. The detailed steps are described hereinafter. In step S901, the electronic device 10 receives the first input after the first unlocking operation interface is displayed on the touch screen 110. In brief, the first unlocking operation interface allows the user to enter the symbol information that is previously selected by the user to the electronic device 10, and the user may enter the first input through the touch screen 110 or the physical input unit of the electronic device 10. For example, the electronic device 10 may receive the first input through the handwriting input interface or the software input unit (e.g. QWERTY, any other virtual keyboard, or any other input interface) displayed on the touch screen. Alternatively, the user may also enter the first input through the physical keyboard or generate the first input through the sliding operation illustrated in FIG. 3B, but the invention is not limited thereto.

In step S902, the electronic device 10 displays the second unlocking operation interface on the touch screen according to the first input and the interface parameters, wherein the interface parameter includes an appearance setting and the number of the sub-regions, and the second unlocking operation interface includes a plurality of sub-regions corresponding to the number of the sub-regions. In brief, during the setting operation, the user already determines the appearance of the second unlocking operation interface, such as the size, the shape of the second unlocking operation interface (e.g., shaped as a rectangle, a square, a triangle, or a star, but the invention is not limited thereto), etc. Thus, after the electronic device 10 receives the first input, the electronic device 10 displays the second unlocking operation interface set by the user or by default.

In step S901, the electronic device 10 recognizes the candidate symbol corresponding to the first input after the electronic device 10 receives the first input, wherein the candidate symbol is the numerical symbol, the alphabetical symbol, or the punctuation symbol. Next, when the second unlocking operation interface is displayed on the touch screen 110, the electronic device 10 displays the candidate symbols in each sub-region respectively.

Figure 10:
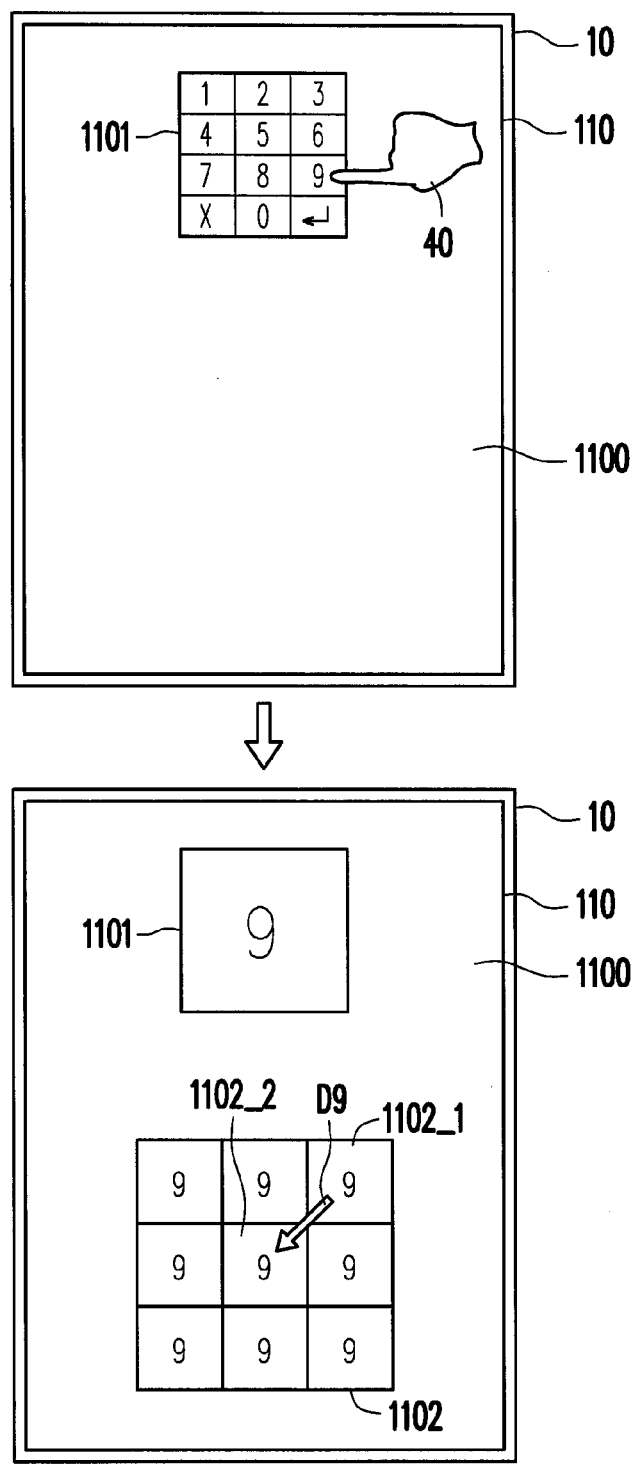
FIG. 10 is a schematic diagram of an unlocking interface of an electronic device according to an embodiment of the invention.

For example, FIG. 10 is a schematic diagram of an unlocking interface of an electronic device according to an embodiment of the invention. As shown in FIG. 10, when the electronic device 10 is at the locking state, the first unlocking interface 1101 of the user interface 1100 is a type of software keyboard, wherein such software keyboard provides input choices from 0 to 9. When the electronic device 10 receives the first input through the first unlocking operation interface 1101 (i.e., the user touches the region displaying the number "9" by his or her hand 40), the electronic device 10 recognizes the number "9" as the candidate symbol corresponding to the first input. Next, the electronic device 10 displays the number "9" on the first unlocking operation interface 1101. In addition, the electronic device 10 displays the second unlocking operation interface 1102 on the touch screen 110 according to the settings of parameters and the first input. In the present embodiment, as illustrated in FIG. 10, the appearance of the second unlocking operation interface 1102 is a nine-square grid, the second unlocking operation interface 1102 has 9 sub-regions, and the number "9" is displayed in each sub-region. In the unlocking interface illustrated in FIG. 10, note that the first unlocking operation interface does not overlap with the second unlocking operation interface. But in other embodiments, the first unlocking operation interface may overlap with the second unlocking operation interface. That is, after the first unlocking operation interface is displayed for receiving the first input, the second unlocking operation interface is displayed and covers the top of the first unlocking operation interface.

In step S903, the electronic device 10 receives the sliding operation applied on the second unlocking interface through the touch screen 110. The start point of the sliding operation is located at the first sub-region of the sub-regions included in the second unlocking operation interface, and the end point of the sliding operation is located at the second sub-region of the sub-regions included in the second unlocking operation interface. In step S904, the sliding operation is recognized as the second input by the electronic device 10. With reference to FIG. 10, the user performs a sliding operation on the touch screen 110, and the sliding operation starts at the first sub-region 1102_1 located at the upper-left corner of the second unlocking operation interface 1102 and stops at the second sub-region 1102_2 located at the center of the second unlocking operation interface 1102. In other words, the start point of the sliding operation is located at the first region 1102_1 of the sub-regions included in the second unlocking operation interface 1102, and the end point of the sliding operation is located at the second region 1102_2 of the sub-regions included in the second unlocking operation interface 1102. The sliding operation applied on the second unlocking operation interface 1102 is recognized as the second input by the electronic device 10.

In step S905, the electronic device 10 obtains the symbol information displayed on the touch screen 110 according to the first input and obtains the direction information according to the second input. In detail, the electronic device 10 can receive the first input through the touch screen 110 or through the physical input unit and obtain the corresponding symbol information from a plurality of the candidate symbols according to the first input. Moreover, the electronic device 10 obtains the direction information according to the sliding operation. For example, if the number "9" is chosen as the unlocking symbol by the user, as illustrated in FIG. 10, the sliding operation of the user is moved from the first sub-region 1102_1 to the second sub-region 1102_2 along the direction D9. At this moment, the electronic device 10 obtains the number "9" as the symbol information and sets the direction D9 as the direction information entered by the user In step S907, the electronic device 10 determines whether the symbol information and the direction information match the predefined unlocking condition. In brief, if the symbol information matches the unlocking symbol, and if the direction information matches the unlocking direction, it is determined that the symbol information and the direction information match the predefined unlocking condition. The unlocking symbol and the unlocking direction may be default or may be generated through the steps illustrated in FIG. 7. Next, in step S908, when the symbol information and the direction information match the predefined unlocking condition, the electronic device 10 is switched to the unlocking state. In step S909, when the symbol information and the direction information do not match the predefined unlocking conditions, the electronic device 10 is maintained at the locking state.

Based on the descriptions of the setting operation and the unlocking operation, it can be understood that the electronic device 10 may determine whether the relative position between the second sub-region chosen by the user and each sub-region included in the second unlocking operation interface matches the relative position between the end sub-region and each sub-region included in the second setting interface. If they are matched, then when the symbol information matches the unlocking symbol and the direction information matches the unlocking direction, the electronic device 10 determines that the symbol information and the direction information match the predefined unlocking condition. In brief, the end sub-region does not have a fixed position because it may be chosen by the user; thus, the sliding operation with the same direction information but different end sub-regions may be recognized by comparing the end sub-regions, and the flexibility and the extensibility of applying the sliding operation to determine whether to unlock the device may be increased.

Figure 11:
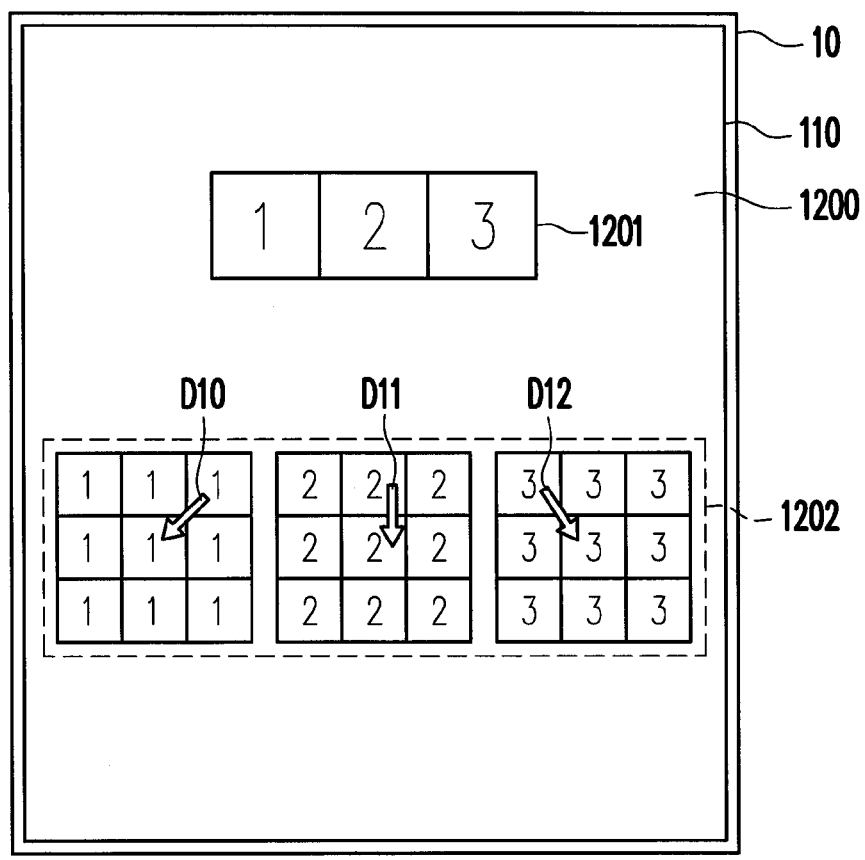
FIG. 11 is an exemplary schematic diagram of an unlocking method according to an embodiment of the invention.

In addition, the examples above are illustrated in case of one unlocking symbol and one unlocking direction, whereas the invention is not limited thereto. The number of the unlocking symbols and the number of the unlocking directions are set according to the actual requirements as long as the unlocking method is performed by means of the unlocking symbol and the unlocking direction along which the touch operation is performed. For example, FIG. 11 is an exemplary schematic diagram of an unlocking method according to an embodiment of the invention. An unlocking operation interface 1200 is displayed on the touch screen of the electronic device 10. After the first input is entered by the user, the first unlocking interface 1201 displays three numbers (1, 2, and 3) chosen by the user.

Thus, based on the settings of the interface parameters, the second unlocking operation interface 1202 including 3 nine-square grids is displayed by the touch screen 110. The number "1" is displayed in each sub-region of the first nine-square grid placed on the left. The number "2" is displayed in each sub-region of the second nine-square grid placed at the center. The number "3" is displayed in each sub-region of the third nine-square grid placed on the right. In this way, the user may enter the direction information D10 to D12 corresponding to each symbol through the sliding operation in each nine-square grid, respectively. The electronic device 10 is switched to the unlocking state only when all the direction information and the symbol information satisfy the direction conditions and the symbol conditions of the unlocking conditions.

In conclusion, the invention is directed to the electronic device and the unlocking method thereof. The electronic device is unlocked by detecting the direction information of the sliding operation as well as the symbol information applied by the user. By combining the direction information and the symbol information, the possibility of cracking the password is reduced. In addition, the unlocking operation interface for the user to perform the sliding operation is set by the user or by the system default, so that the design specification is satisfied. Thus, the electronic device and the unlocking method thereof provided herein can increase the security of the locking mechanism effectively and the flexibility of use.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An unlocking method of an electronic device having a touch screen, the unlocking method comprising:
   receiving at least one touch operation performed on the touch screen;
   receiving a first input and a second input corresponding to each other when the electronic device is at a locking state, wherein the first input and the second input are generated according to the at least one touch;
   obtaining symbol information displayed on the touch screen according to the first input and obtaining direction information according to the second input;
   simultaneously comparing the symbol information and the direction information with a predefined unlocking condition to determine whether the symbol information and the direction information match the predefined unlocking condition, wherein the symbol information of the first input comprises at least one input symbol entered by a user, the direction information of the second input comprises at least one moving direction of at least one sliding operation performed by the user, the at least one input symbol is respectively corresponding to the at least one moving direction, and the predefined unlocking condition includes an unlocking symbol and an unlocking direction;
   switching the electronic device to an unlocking state if the symbol information and the direction information match the predefined unlocking condition; and
   maintaining the electronic device at the locking state if the symbol information and the direction information do not match the predefined unlocking condition.

2. The unlocking method according to claim 1, wherein the step of receiving the first input and the second input corresponding to each other when the electronic device is at the locking state includes:
   receiving the first input after receiving the second input.

3. The unlocking method according to claim 2, wherein the step of receiving the first input after receiving the second input includes:
   displaying an unlocking operation interface on the touch screen, wherein the unlocking operation interface includes a symbol confirmation region;
   receiving the second input applied on the unlocking operation interface through the touch screen, wherein the moving direction of the second input matches a first predefined direction or a second predefined direction;
   displaying one of a plurality of candidate symbols in turns in the symbol confirmation region of the unlocking operation interface according to the moving direction of the second input, wherein types of the candidate symbols include one of or a combination of numerical symbols, alphabetical symbols, and punctuation symbols; and
   receiving the input symbol of the first input generated in the symbol confirmation region of the unlocking operation interface after the second input disappears for a predefined period of time.

4. The unlocking method according to claim 3, wherein the step of obtaining the symbol information displayed on the touch screen according to the first input and obtaining the direction information according to the second input includes:
   obtaining the direction information according to the moving direction before the second input disappears; and
   obtaining the symbol information according to the one of the candidate symbols displayed in the symbol confirmation region when receiving the first input.

5. The unlocking method according to claim 3, wherein the method further includes:
   displaying a setting interface on the touch screen before the electronic device enters the locking state, wherein the setting interface includes the symbol confirmation region;
   receiving an unlocking setting input applied on the setting interface through the touch screen, wherein a moving direction of the unlocking setting input matches the first predefine direction or the second predefine direction;
   displaying one of the candidate symbols in turns in the symbol confirmation region of the setting interface according to the moving direction of the unlocking setting input;
   setting the one of the candidate symbols displayed in the symbol confirmation region of the setting interface as the unlocking symbol after receiving an input confirmation; and
   setting the last moving direction of the unlocking setting input as the unlocking direction before receiving the input confirmation.

6. The unlocking method according to claim 5 further including:
   determining the symbol information and the direction information match the predefined unlocking condition if the symbol information matches the unlocking symbol and if the direction information matches the unlocking direction.

7. The unlocking method according to claim 1, wherein the step of receiving the first input and the second input corresponding to each other when the electronic device is at the locking state includes:
   receiving the second input after receiving the first input.

8. The unlocking method according to claim 7, wherein the step of receiving the second input after receiving the first input includes:
   receiving the first input after displaying a first unlocking operation interface on the touch screen;
   displaying a second unlocking operation interface on the touch screen according to the first input and an interface parameter, wherein the interface parameter includes an appearance setting and the number of sub-regions, the second unlocking operation interface includes a plurality of sub-regions corresponding to the number of the sub-regions;

receiving the sliding operation applied on the second unlocking operation interface through the touch screen, wherein a start point of the sliding operation is located at a first sub-region of the sub-regions included in the second unlocking operation interface, and an end point of the sliding operation is located at a second sub-region of the sub-regions included in the second unlocking operation interface; and recognizing the sliding operation as the second input.

9. The unlocking method according to claim 8, wherein the second unlocking operation interface displayed on the touch screen overlaps with the first unlocking operation interface on the touch screen.

10. The unlocking method according to claim 8 further including:
recognizing the input symbol which is a candidate symbol corresponding to the first input after receiving the first input, wherein the candidate symbol is a numerical symbol, an alphabetical symbol, or a punctuation symbol;
displaying the candidate symbol on the first unlocking operation interface; and
displaying the candidate symbol in each of the sub-regions respectively when displaying the second unlocking operation interface on the touch screen.

11. The unlocking method according to claim 8 further including:
receiving the first input through the touch screen or through a physical input unit of the electronic device.

12. The unlocking method according to claim 10, wherein the steps of obtaining the symbol information displayed on the touch screen according to the first input and obtaining the direction information according to the second input include:
obtaining the symbol information according to the candidate symbol; and
obtaining the direction information according to the moving direction of the sliding operation.

13. The unlocking method according to claim 10, wherein the method further includes:
before the electronic device enters the locking state, setting the interface parameter and displaying a first setting interface on the touch screen to receive a first unlocking setting input;
recognizing a symbol corresponding to the first unlocking setting input, wherein the symbol is a numerical symbol, an alphabetical symbol, or a punctuation symbol;
after receiving an input confirmation, setting the symbol as the unlocking symbol and displaying a second setting interface on the touch screen according to the symbol and the interface parameter, wherein the second setting interface includes a plurality of sub-regions, the number of the sub-regions matches the number of the sub-regions, and the symbol is displayed in a portion of or all of the sub-regions, respectively;
receiving a second unlocking setting input through the touch screen, wherein a start point of the second unlocking setting input is located at a start sub-region of the sub-regions included in the second setting interface, and an end point of the second unlocking setting input is located at an end sub-region of the sub-regions included in the second setting interface; and
setting a moving direction of the second unlocking setting input as the unlocking direction when receiving another input confirmation.

14. The unlocking method according to claim 13, wherein the end sub-region among the sub-regions in the second setting interface has a fixed position.

15. The unlocking method according to claim 13 further including:
displaying a first reminding effect in the start sub-region when the touch screen receives the second unlocking setting input; and
displaying a second reminding effect in the end sub-region when the second unlocking setting input is completed.

16. The unlocking method according to claim 13 further including:
determining whether a relative position between the second sub-region and the sub-regions included in the second unlocking operation interface matches a relative position between the end sub-region and the sub-regions included in the second setting interface; and
if yes, then determining that the symbol information and the direction information match the predefined unlocking condition if the symbol information matches the unlocking symbol and if the direction information matches the unlocking direction.

17. An electronic device comprising:
a touch screen;
a memory;
at least one processor; and
at least one program, wherein the at least one program is stored in the memory and is configured to be executed by the at least one processor, and the at least one program includes following commands:
receiving at least one touch operation performed on the touch screen;
receiving a first input and a second input corresponding to each other when the electronic device is at a locking state, wherein the first input and the second input are generated according to the at least one touch;
obtaining symbol information displayed on the touch screen according to the first input and obtaining direction information according to the second input;
simultaneously comparing the symbol information and the direction information with a predefined unlocking condition to determine whether the symbol information and the direction information match the predefined unlocking condition, wherein the symbol information of the first input comprises at least one input symbol entered by a user, the direction information of the second input comprises at least one moving direction of at least one sliding operation performed by the user, the at least one input symbol is respectively corresponding to the at least one moving direction, and the predefined unlocking condition includes an unlocking symbol and an unlocking direction;
switching the electronic device to an unlocking state if the symbol information and the direction information match the predefined unlocking condition; and
maintaining the electronic device at the locking state if the symbol information and the direction information do not match the predefined unlocking condition.

18. The electronic device according to claim 17, wherein the command of receiving the first input and the second input corresponding to each other when the electronic device is at the locking state includes:
receiving the first input after receiving the second input.

19. The electronic device according to claim 18, wherein the command of receiving the first input after receiving the second input includes:
displaying an unlocking operation interface on the touch screen, wherein the unlocking operation interface includes a symbol confirmation region;

receiving the second input applied on the unlocking operation interface through the touch screen, wherein the moving direction of the second input matches a first predefined direction or a second predefined direction;

displaying one of a plurality of candidate symbols in turns in the symbol confirmation region of the unlocking operation interface according to the moving direction of the second input; and receiving the input symbol of the first input generated in the symbol confirmation region of the unlocking operation interface after the second input disappears for a predefined period of time.

20. The electronic device according to claim 19, wherein the command of obtaining the symbol information displayed on the touch screen according to the first input and obtaining the direction information according to the second input includes:

obtaining the direction information according to the moving direction before the second input disappears; and obtaining the symbol information according to the one of the candidate symbols displayed in the symbol confirmation region when receiving the first input.

21. The electronic device according to claim 19, wherein the at least one program further includes following commands:

displaying a setting interface on the touch screen before the electronic device enters the locking state, wherein the setting interface includes a symbol confirmation region;

receiving an unlocking setting input applied on the setting interface through the touch screen, wherein a moving direction of the unlocking setting input matches the first predefined direction or the second predefined direction;

displaying one of the candidate symbols in turns in the symbol confirmation region of the setting interface according to the moving direction of the unlocking setting input;

setting the one of the candidate symbols displayed in the symbol confirmation region of the setting interface as the unlocking symbol after receiving an input confirmation; and setting the last moving direction of the unlocking setting input as the unlocking direction before receiving the input confirmation.

22. The electronic device according to claim 21, wherein the at least one program further includes following commands:

determining the symbol information and the direction information match the predefined unlocking condition if the symbol information matches the unlocking symbol and if the direction information matches the unlocking direction.

23. The electronic device according to claim 17, wherein the command of receiving the first input and the second input corresponding to each other when the electronic device is at the locking state includes:

receiving the second input after receiving the first input.

24. The electronic device according to claim 23, wherein the command of receiving the second input after receiving the first input includes:

receiving the first input after displaying a first unlocking operation interface on the touch screen;

displaying a second unlocking operation interface on the touch screen according to the first input and an interface parameter, wherein the interface parameter includes an appearance setting and the number of sub-regions, and the second unlocking operation interface includes a plurality of sub-regions corresponding to the number of the sub-regions;

receiving the sliding operation applied on the second unlocking operation interface through the touch screen, wherein a start point of the sliding operation is located at a first sub-region of the sub-regions included in the second unlocking operation interface, and an end point of the sliding operation is located at a second sub-region of the sub-regions included in the second unlocking operation interface; and recognizing the sliding operation as the second input.

25. The electronic device according to claim 24, wherein the second unlocking operation interface displayed on the touch screen does not overlap with the first unlocking operation interface displayed on the touch screen.

26. The electronic device according to claim 24, wherein the at least one program further includes following commands:

recognizing the input symbol which is a candidate symbol corresponding to the first input after receiving the first input, wherein the candidate symbol is a numerical symbol, an alphabetical symbol, or a punctuation symbol;

displaying the candidate symbol on the first unlocking operation interface; and displaying the candidate symbol in each of the sub-regions when displaying the second unlocking operation interface on the touch screen.

27. The electronic device according to claim 24, wherein the at least one program includes following commands:

receiving the first input through the touch screen or through a physical input unit of the electronic device.

28. The electronic device according to claim 26, wherein the command of obtaining the symbol information displayed on the touch screen according to the first input and obtaining the direction information according to the second input includes:

obtaining the symbol information according to the candidate symbol; and obtaining the direction information according to the moving direction of the sliding operation.

29. The electronic device according to claim 26, wherein the at least one program further includes following commands:

before the electronic device enters the locking state, setting the interface parameter and displaying a first setting interface on the touch screen to receive a first unlocking setting input;

recognizing a symbol corresponding to the first unlocking setting input, wherein the symbol is a numerical symbol, an alphabetical symbol, or a punctuation symbol;

when receiving an input confirmation, setting the symbol as the unlocking symbol and displaying a second setting interface on the touch screen according to the symbol and the interface parameter, wherein the second setting interface includes a plurality of sub-regions corresponding to the number of the sub-regions, and the symbol is displayed on a portion or all of the sub-regions respectively;

receiving a second unlocking setting input through the touch screen, wherein a start point of the second unlocking setting input is located at a start sub-region of the sub-regions included in the second setting interface, and an end point of the second unlocking setting input is located at the end sub-region of the sub-regions included in the second setting interface; and setting a moving direction of the second unlocking setting input as the unlocking direction when receiving another input confirmation.

30. The electronic device according to claim 29, wherein the end sub-region among the sub-regions included in the second setting interface has a non-fixed position.

31. The electronic device according to claim 29, wherein the at least one program further includes following commands:
- displaying a first reminding effect in the start sub-region when the touch screen receives the second unlocking setting input; and
- displaying a second reminding effect in the end sub-region when the second unlocking setting input is completed.

32. The electronic device according to claim 29, wherein the at least one program further includes following commands:
- determining whether a relative position between the second sub-region and the sub-regions included in the second unlocking operation interface matches a relative position between the end sub-region and the sub-regions included in the second setting interface; and
- if yes, then determining that the symbol information and the direction information match the predefined unlocking condition if the symbol information matches the unlocking symbol and if the direction information matches the unlocking direction.

* * * * *